2,995,606
TRICYCLIC KETONE AND PROCESS OF PREPARATION
Hyman M. Molotsky, Chicago, Ill., assignor to Velsicol Chemical Corporation, Chicago, Ill., a corporation of Illinois
No Drawing. Filed Mar. 6, 1959, Ser. No. 797,583
8 Claims. (Cl. 260—586)

This invention relates to a new composition of matter and its method of preparation, and more particularly to the thermally induced conversion of 1,2,3,4,7-pentachloro-7-alkoxybicyclo(2.2.1)-2,5-heptadiene to form its saturated ketonic derivative.

Unexpectedly I have found, in accordance with the present invention, that when a compound having the structure

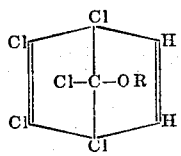

wherein R is selected from the group consisting of aliphatic, cycloaliphtic, and aryl hydrocarbon radicals containing up to 14 carbon atoms, is heated at an elevated temperature its saturated ketonic derivative is formed. Compounds of the aforesaid structure can be prepared by the reaction of 1,2,3,4,7,7-hexachlorobicyclo(2.2.1)-2,5-heptadiene and an organic alcohol in the presence of an alkali, as more particularly described and claimed in my copending application Serial No. 651,174 filed April 8, 1957, now Patent No. 2,897,240.

In accordance with the present invention there is obtained 1,3,4,5,6-pentachloro-7-ketotricyclo(2.2.1.0$^{2,6}$)heptane, as represented by the following structural formula:

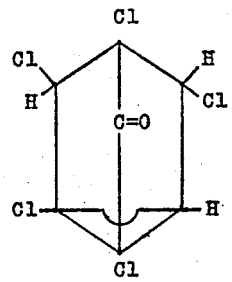

As is evident from a comparison of the structural configuration of the starting materials and final product, the present reaction involves a series of complicated steps. While the mechanism of this reaction is not known with certainty, it is believed that it includes an intermediate conversion of the ether group to a hydroxy group which in turn is transformed to the carbonyl group, the shifting of a bond and the shifting of a hydrogen and a chlorine atom.

The present process in essence can be readily performed by heating the reactant at an elevated temperature. Thus, the reaction can be performed at temperatures higher than room temperature and lower than the decomposition temperature of the reactant which will vary somewhat with the exact identity of the ether group. In general, temperatures between about 50 and 350° C. are operable and temperatures between about 150° C. and 300° C. are preferred. Optimum yields are obtained at temperatures between about 225° C. and 275° C. The required reaction temperature can be lowered and the corresponding yields improved by the addition of an ether cleaving agent, such as hydroiodic acid. While the reaction can be performed under atmospheric pressure, it can be employed with pressures above and below atmospheric. If desired, the present process can be performed as a continuous process, although the ensuing examples are of batch processes.

While it is possible to perform the present process in the absence of solvent, the use of an inert solvent is desirable, since it facilitates control of the reaction temperature and recovery of the product. In general, inert hydrocarbon solvents with boiling points within the aforementioned ranges are operable and higher boiling solvents such as diphenyl ether, chloro and ethyl toluene, silicone oils, etc., are preferred. The time of reaction will vary with the precise identity of the ether group; the temperature; the solvent, if any; the equipment, etc. It is preferred to keep the time at a minimum by operating in the preferred temperature range so as to prevent discoloration and other possible undesirable reactions.

Preferred starting reactants are the 1,2,3,4,7-pentachloro - 7 - alkoxybicyclo(2.2.1) - 2,5 - heptadienes, wherein the alkoxy group contains up to 14 carbon atoms. They can be prepared by the reaction of 1,2,3,4,7,7-hexachlorobicyclo(2.2.1)-2,5-heptadiene and linear saturated aliphatic hydrocarbon alcohols containing up to 14 carbon atoms, in the presence of alkaline reacting materials. This reaction results in the replacement of one bridge chlorine atom with an alkoxy group. The preparation of the reactant can be performed at temperatures between about 50° C. and 200° C., under atmospheric or other pressures, and in the presence or absence of solvent. A convenient procedure is the use of an excess quantity of alcohol as solvent. Various alkaline materials such as potassium hydroxide or sodium hydroxide can be used with relatively equal results.

The following examples illustrate the performance of the present process and preparation of the precursor reactant.

EXAMPLE 1

*Preparation of 1,2,3,4,7-pentachloro-7-isopropoxy bicyclo(2.2.1)-2-5-heptadiene*

1,2,3,4,7,7 - hexachlorobicyclo(2.2.1) - 2,5 - heptadiene (604 grams; 2.02 mols) was placed in a three-necked reaction vessel equipped with stirrer, thermometer, heating mantle and reflux condenser and containing potassium hydroxide (190 grams; 2.9 mols) and isopropyl alcohol (868 grams; 14.4 mols). The reaction mixture was heated to reflux, approximately 90° C., and maintained at reflux for about four hours.

The unreacted material was removed by distillation under reduced pressure and the residue dissolved in diethyl ether. This ether solution was washed with water, dried over anhydrous sodium sulfate, and the diethyl ether removed by distillation under reduced pressure. The desired product was recovered by fractionation of the residue of the diethyl ether removal as the fraction with a boiling point of 99°–105° C. at 0.8 mm. Hg pressure. This crude product was purified by chromatographic means. Its boiling point was found to be 105° C. at 0.8 mm. Hg and its refractive index $N_D^{20}$ 1.5213.

The compound was analyzed for $C_{10}H_9Cl_5O$:

|  | C | H | Cl |
|---|---|---|---|
| Theoretical | 37.24 | 2.81 | 54.97 |
| Found | 36.89 | 2.85 | 55.43 |

EXAMPLE 2

*Rearrangement of 1,2,3,4,7-pentachloro-7-isopropoxy bicyclo(2.2.1)-2,5-heptadiene*

1,2,3,4,7-pentachloro-7-isopropoxybicyclo(2.2.1) - 2,5-heptadiene (66 grams; 0.21 mol) was placed in a three-necked glass reaction vessel equipped with stirrer, thermometer, and heating mantle. The mixture was heated and maintained at a temperature between about 220° and 250° C. for two hours. At the end of the reaction time, the mixture was cooled to room temperature and the product recovered by filtration. This solid product was recrystallized from hexane and found to have a melting point of 120°–121° C.

The product was analyzed for $C_7H_3Cl_5O$:

|  | C | H | Cl |
|---|---|---|---|
| Theoretical | 29.98 | 1.07 | 63.22 |
| Found | 30.05 | 1.13 | 63.04 |

By cyroscopic determination the molecular weight was determined to be 287.8. (Theoretical molecular weight for the above empirical formula is 280.4.) Infrared analysis showed the presence of a carbonyl bond, the absence of a hydroxy group and the absence of carbon-to-carbon double bonds. Thus, its structure is believed to conform to that previously shown.

The filtrate obtained from the previously mentioned filtration was distilled at 95° C. under 0.3 mm. Hg pressure. A portion of the distillate solidified on standing. After being recrystallized from pentane it was found to have a melting point of 155°–156° C.

This compound was analyzed for $C_7H_3Cl_5O$:

|  | C | H | Cl |
|---|---|---|---|
| Theoretical | 29.98 | 1.07 | 63.22 |
| Found | 30.05 | 1.13 | 63.04 |

Infrared analysis showed the presence of carbonyl bond, the absence of a hydroxy group and the absence of a carbon-to-carbon double bond. This compound is thus believed to be an isomer of the first described product.

EXAMPLE 3

*Preparation of 1,2,3,4,7-pentachloro-7-butoxybicyclo-(2.2.1)-2,5-heptadiene* n-Butanol (810 grams; 10.9 mols) was placed in a glass reaction flask equipped with stirrer, heating mantle, reflux condenser, and thermometer. Sodium (41 grams) was added thereto. After the solution was raised to reflux temperature, 1,2,3,4,7,7-hexachlorobicyclo(2.2.1)-2,5-heptadiene (596 grams; 2 mols) was uniformly added over a two-hour period. The solution was maintained at reflux for about 120 hours. After filtration, the unreacted butanol was removed in vacuo, leaving a residue which was dissolved in pentane and placed in a clay column. The product was then eluted with a mixture of 95 parts by weight pentane and 5 parts by weight ether. This solvent was then removed in vacuo and the product distilled as the fraction boiling at 77°–105° C. at 0.08 mm. Hg pressure. A second redistillation yielded a product boiling at 95°–99° C. at 0.08 mm. Hg.

The product was analyzed for $C_{11}H_{11}Cl_5O$:

|  | C | H | Cl |
|---|---|---|---|
| Theoretical | 39.27 | 3.27 | 52.71 |
| Found | 38.26 | 3.28 | 54.01 |

EXAMPLE 4

*Preparation of 1,2,3,4,7-pentachloro-7-butoxybicyclo-(2.2.1)-2,5-heptadiene*

1,2,3,4,7-pentachloro-7-butoxybicyclo(2.2.1)-2,5-heptadiene (27 grams; 0.08 mol) was placed in a glass reaction flask equipped with thermometer, stirrer, heating mantle, and reflux condenser, and containing glacial acetic acid (100 ml.). Hydroiodic acid (100 ml. of 57% solution) was added to the reaction mixture which was then heated to reflux and maintained at reflux for five hours. The solution was cooled to room temperature, poured into water (800 ml.) and neutralized with sodium bicarbonate until carbon dioxide was no longer evolved. This solution was extracted with ether and the ether extract dried over calcium chloride. Then the ether solution was filtered and the product recovered. After being recrystallized twice from pentane, it was found to have a melting point of 120°–122° C., identical with the product of Example 2. An infrared analysis confirmed the fact that this product was identical with product of Example 2.

EXAMPLE 5

*Preparation of 1,2,3,4,7-pentachloro-7-tetradecoxybicyclo-(2.2.1)-2,5-heptadiene*

1,2,3,4,7,7-hexachlorobicyclo(2.2.1) - 2,5 - heptadiene (596 grams; 2 mols) is placed in a three-necked glass reaction flask equipped with stirrer, thermometer, reflux condenser and heating mantle and containing potassium hydroxide (190 grams; 2.9 mols) and tetradecyl alcohol (1284 grams; 6 mols). The reaction mixture is heated to reflux and maintained at reflux for about four hours.

The unreacted material is removed by distillation under reduced pressure and the residue dissolved in diethyl ether. This ether solution is washed with water, dried over anhydrous sodium sulfate, and the diethyl ether is removed in distillation under reduced pressure. The desired product is recovered by fractionation of the residue of the diethyl ether removal and purified by chromatographic means.

EXAMPLE 6

*Rearrangement of 1,2,3,4,7-pentachloro-7-tetradecoxybicyclo(2.2.1)-2,5-heptadiene*

1,2,3,4,7-pentachloro-7-tetradecoxybicyclo(2.2.1) - 2,5-heptadiene is placed in a three-necked glass reaction flask equipped with stirrer, thermometer, heating mantle and reflux condenser. The mixture is heated and maintained at a temperature between about 225° and 275° C. for two hours. At the completion of the reaction period, the mixture is cooled to room temperature and the product recovered by filtration. This solid product is recrystallized from hexane and found to have a melting point of 120°–121° C. Infrared analysis shows it to be identical to the products of Examples 1 and 3.

As is evident from the previously submitted structural representation and the novel process for its preparation, the present compound has a multiplicity of functional groups and a unique saturated tricyclic configuration. It is a compound heretofore thought of as not being preparable. As a consequence of its unique structure it has a multiplicity of utility including as a stabilizer-plasticizer for resins, a solvent, dispersant, fumigant, etc.

Of particular importance is its utility as a miticide and as a fungicide. The following examples show its value for these uses.

EXAMPLE 7

The present product was formulated as a 10 percent wettable powder and dispersed in water at a concentration of 0.4 percent by weight. Plants infested with two-spotted spider mites were dipped therein. The percent mortality of the mites after 72 hours was determined to be 100 percent.

EXAMPLE 8

The present product was tested by the slide germination technique adopted by the Committee on Standardization of Fungicidal Tests of the American Phytopathological Society for its effectiveness in controlling of *F. roseum*. Measured concentrations of spores were placed on glass slides in contact with different concentrations of the present compound. Percent germination of the spores was then determined for each treatment after 24 hours incubation at 72° F. Two replicates were used at each concentration.

| Concentration (p.p.m.): | Spore germination (percent) |
|---|---|
| 1 | 1 |
| 10 | 0 |
| 100 | 0 |
| 1000 | 0 |

ED$_{50}$ p.p.m. (dosage effective for 50% control), less than one part per million.

EXAMPLE 9

The present product was tested by the slide germination technique adopted by the Committee on Standardization of Fungicidal Tests of the American Phytopathological Society for its effectiveness in controlling of *M. fructicola*. Measured concentrations of spores were placed on glass slides in contact with different concentrations of the present compound. Percent germination of the spores was then determined for each treatment after 24 hours incubation at 72° F. Two replicates were used at each concentration.

| Concentration (p.p.m.): | Spore germination (percent) |
|---|---|
| 1 | 1 |
| 10 | 0 |
| 100 | 0 |
| 1000 | 0 |

ED$_{50}$ p.p.m. (dosage effective for 50% control), less than one part per million.

In commercial applications, it is generally desirable to formulate miticides and fungicides as dusts, granular, wettable powders, emulsifiable concentrates, etc.

Formulations of this invention can be prepared by mixing the new compound of this invention with inert carriers to provide formulations adapted for ready and efficient application with conventional applicator equipment to the site of the pest infestation. Thus, formulations of the present product are prepared in the form of solids or liquids. Solid compositions are preferably in the form of dusts. These are prepared to give homogeneous, free-flowing dusts by admixing the compound of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid formulations are prepared by admixing the new compound of this invention with a suitable inert liquid diluent. The compound is sufficiently soluble in many common organic solvents such as kerosene, xylene, fuel oil, the alkylated naphthalenes, and the like, so that they can be used directly as solutions. However, the formulations can also contain a surface-active agent of the kind used in the art to enable the present compound to be readily dispersed in water or other liquids to give sprays, which are a preferred method of applying the active compound of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, methyl cellulose, sodium salt of ligninsulfonic acid, and polyoxyethylene fatty alcohol ethers. Mixtures of such agents can be used to combine or modify properties. The proportion of these agents will ordinarily vary from about 1% or less to about 15% by weight of the pesticidal compositions. Other ingredients such as insecticides, fungicides, fertilizers, activators, adhesives, spreaders, and synergists can be added to these formulations if desired. The manner in which these formulations can be prepared is illustrated in the following examples. All quantities given are in parts by weight.

EXAMPLE 10

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| Present compound | 25 |
| Sodium lauryl sulfate | 2 |
| Sodium lignin sulfonate | 3 |
| Kerosene | 70 |

EXAMPLE 11

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| Present compound | 75.00 |
| Fuller's earth | 22.75 |
| Sodium lauryl sulfate | 2.00 |
| Methyl cellulose | .25 |

EXAMPLE 12

*Preparation of an oil-dispersible powder*

The following components are blended and ground as described in the previous example to give a powder which can be dispersed in oil to form a spray containing the desired concentration of active compound.

| | |
|---|---|
| Present compound | 70 |
| Condensation product of diamylphenol with ethylene oxide | 4 |
| Fuller's earth | 26 |

EXAMPLE 13

*Preparation of a dust*

The following ingredients are mixed thoroughly and then ground to an average particle size of less than about 50 microns to give a dust suitable for application with conventional dusting equipment.

| | |
|---|---|
| Present compound | 20 |
| Talc | 80 |

EXAMPLE 14

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. Dextrin in this formulation serves as a binding agent.

| | |
|---|---|
| Present compound | 10 |
| Fuller's earth | 66 |
| Dextrin | 20 |
| Sodium lignin sulfonate | 3 |
| Kerosene | 1 |

I claim:

1. A compound having the following structure

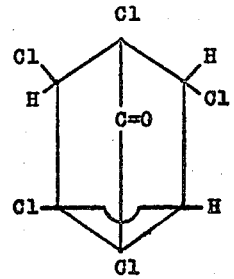

2. The method of forming a saturated ketonic derivative of 1,2,3,4,7-pentachloro-7-alkoxy bicyclo-(2.2.1)-2,5- heptadiene which comprises heating said diene at a temperature between about 50° C. and 350° C.

3. The process of claim 2 wherein the temperature is between about 225° C. and 275° C.

4. The process of claim 2 wherein the alkoxy group contains from 1 to 14 carbon atoms.

5. The process of claim 2 wherein the alkoxy group is butoxy.

6. The process of claim 2 wherein the alkoxy group is isopropoxy.

7. The process of claim 2 wherein the alkoxy group is tetradecoxy.

8. The method of forming a saturated ketonic derivative of 1,2,3,4,7-pentachloro-7-alkoxy bicyclo-(2.2.1)-2,5-heptadiene which comprises heating said diene at a temperature between about 150° C. and 300° C. in the presence of an inert solvent.

References Cited in the file of this patent

UNITED STATES PATENTS

| | | |
|---|---|---|
| 2,309,576 | Converse | Jan. 26, 1943 |
| 2,730,548 | Bluestone et al. | Jan. 10, 1956 |
| 2,864,680 | Degginger | Dec. 16, 1958 |